US010253233B2

(12) United States Patent
Poole et al.

(10) Patent No.: US 10,253,233 B2
(45) Date of Patent: Apr. 9, 2019

(54) NON-OZONE DEPLETING AND LOW GLOBAL WARMING REFRIGERANT BLENDS

(71) Applicant: RPL HOLDINGS LIMITED, Hale Altrincham Cheshire (GB)

(72) Inventors: John Edward Poole, Altrincham (GB); Richard Powell, York (GB)

(73) Assignee: RPL HOLDINGS LIMITED, Hale Altrincham, Cheshire (GB)

( * ) Notice: Subject to any disclaimer, the term of this patent is extended or adjusted under 35 U.S.C. 154(b) by 0 days.

(21) Appl. No.: 15/558,540

(22) PCT Filed: Mar. 23, 2016

(86) PCT No.: PCT/GB2016/050827
§ 371 (c)(1),
(2) Date: Sep. 14, 2017

(87) PCT Pub. No.: WO2016/156812
PCT Pub. Date: Oct. 6, 2016

(65) Prior Publication Data
US 2018/0066171 A1 Mar. 8, 2018

(30) Foreign Application Priority Data

Mar. 27, 2015 (GB) .................................. 1505230.1
Feb. 12, 2016 (GB) .................................. 1602586.8

(51) Int. Cl.
*C09K 5/04* (2006.01)
(52) U.S. Cl.
CPC ........ *C09K 5/045* (2013.01); *C09K 2205/122* (2013.01); *C09K 2205/126* (2013.01); *C09K 2205/22* (2013.01); *C09K 2205/40* (2013.01)
(58) Field of Classification Search
CPC ................ C09K 5/045; C09K 2205/40; C09K 2205/122; C09K 2205/126; C09K 2205/22
USPC ......................................................... 252/67
See application file for complete search history.

(56) References Cited

U.S. PATENT DOCUMENTS

| | | |
|---|---|---|
| 4,138,855 A | 2/1979 | Jahan et al. |
| 4,198,313 A | 4/1980 | Bargigia et al. |
| 4,272,960 A | 6/1981 | Wahl, III |
| 4,482,465 A | 11/1984 | Gray |
| 4,810,403 A | 3/1989 | Bivens et al. |
| 4,941,986 A | 7/1990 | Jolly |
| 4,944,890 A | 7/1990 | Deeb et al. |
| 5,026,497 A | 6/1991 | Merchant |
| 5,080,823 A | 1/1992 | Arnaud et al. |
| 5,108,637 A | 4/1992 | Pearson |
| 5,182,040 A | 1/1993 | Bartlett et al. |
| 5,185,094 A | 2/1993 | Shiflett |
| 5,304,320 A | 4/1994 | Barthelemy et al. |
| 5,360,566 A | 11/1994 | Stevenson |
| 5,370,812 A | 12/1994 | Brown |
| 5,417,871 A | 5/1995 | Minor et al. |
| 5,425,890 A | 6/1995 | Yudin et al. |
| 5,458,798 A | 10/1995 | Lunger et al. |
| 5,622,644 A | 4/1997 | Stevenson et al. |
| 5,624,596 A | 4/1997 | Lunger et al. |
| 5,626,790 A | 5/1997 | Minor |
| 5,672,293 A | 9/1997 | Minor et al. |
| 5,685,163 A | 11/1997 | Fujita et al. |
| 5,709,092 A | 1/1998 | Shiflett |
| 5,722,256 A | 3/1998 | Shiflett |
| 5,785,883 A | 7/1998 | Minor et al. |
| 5,954,995 A | 9/1999 | Goble |
| 6,106,740 A | 8/2000 | Powell et al. |
| 6,117,356 A | 9/2000 | Powell et al. |
| 6,508,950 B1 * | 1/2003 | Lim ........................ C09K 5/045 252/67 |
| 6,526,764 B1 | 3/2003 | Singh et al. |
| 6,604,368 B1 | 8/2003 | Powell et al. |
| 6,606,868 B1 | 8/2003 | Powell et al. |
| 6,629,419 B1 | 10/2003 | Powell et al. |
| 6,783,691 B1 | 8/2004 | Bivens et al. |
| 6,991,743 B2 | 1/2006 | Poole et al. |
| 7,279,451 B2 | 10/2007 | Singh et al. |
| 7,569,170 B2 | 8/2009 | Minor |
| 7,972,528 B2 * | 7/2011 | Poole ...................... C09K 5/045 252/68 |
| 8,070,355 B2 * | 12/2011 | Minor ..................... C09K 5/045 374/4 |
| 8,465,664 B2 | 6/2013 | Poole et al. |
| 8,551,354 B2 * | 10/2013 | Poole ...................... C09K 5/045 252/67 |

(Continued)

FOREIGN PATENT DOCUMENTS

DE 4116274 11/1992
EP 539952 10/1992

(Continued)

OTHER PUBLICATIONS

Certified Priority Document, GB1602586.8, filed Feb. 12, 2016. (Year: 2016).*
Office Action dated Apr. 30, 2014, for Chinese Patent Application No. 201080064491.6, with English translation.
Examination Report dated Apr. 15, 2013, for EP Patent Application No. 10807634.0.
International Search Report dated Jan. 16, 2015, for International Patent Application No. PCT/GB2014/053036.
International Search Report, dated Jul. 15, 2016, for International Patent Application No. PCT/GB2016/050827.

(Continued)

*Primary Examiner* — Douglas J McGinty
(74) *Attorney, Agent, or Firm* — Waver Austin Villeneuve & Sampson LLP

(57) ABSTRACT

Non ozone depleting and non flammable refrigerant compositions with GWPs between 1,000 and 1600 ITH which may replace R404A and R507 in refrigeration systems.

16 Claims, No Drawings

(56) References Cited

U.S. PATENT DOCUMENTS

| | | | |
|---|---|---|---|
| 8,889,031 B2 * | 11/2014 | Sawada | C09K 5/045 252/68 |
| 9,023,321 B2 | 5/2015 | Poole et al. | |
| 9,062,237 B2 | 6/2015 | Poole et al. | |
| 9,499,729 B2 * | 11/2016 | Williams | C08J 9/144 |
| 9,624,414 B2 * | 4/2017 | Poole | C09K 5/045 |
| 9,708,522 B2 | 7/2017 | Poole et al. | |
| 9,764,999 B2 * | 9/2017 | Singh | C07C 19/08 |
| 2003/0001132 A1 | 1/2003 | Lee et al. | |
| 2003/0197149 A1 | 10/2003 | Lee et al. | |
| 2004/0016902 A1 | 1/2004 | Lee et al. | |
| 2007/0290163 A1 | 12/2007 | Poole et al. | |
| 2008/0230738 A1 * | 9/2008 | Minor | A62D 1/0057 252/67 |
| 2009/0224199 A1 | 9/2009 | Poole et al. | |
| 2009/0242828 A1 | 10/2009 | Poole et al. | |
| 2011/0226983 A1 | 9/2011 | Poole et al. | |
| 2012/0312048 A1 * | 12/2012 | Poole | C09K 5/045 62/304 |
| 2013/0193369 A1 | 8/2013 | Low | |
| 2014/0158930 A1 | 6/2014 | Poole et al. | |
| 2014/0216075 A1 * | 8/2014 | Singh | A62D 1/0057 62/77 |
| 2014/0331697 A1 | 11/2014 | Minor et al. | |
| 2016/0024362 A1 | 1/2016 | Zhili et al. | |
| 2016/0068731 A1 * | 3/2016 | Minor | C09K 5/044 62/77 |
| 2016/0251556 A1 | 9/2016 | Poole et al. | |
| 2016/0272862 A1 | 9/2016 | Capuciati | |
| 2017/0152423 A1 | 6/2017 | Poole et al. | |

FOREIGN PATENT DOCUMENTS

| | | |
|---|---|---|
| EP | 608164 | 7/1994 |
| EP | 659862 | 7/1994 |
| EP | 430169 | 8/1994 |
| EP | 565265 | 12/1995 |
| EP | 720639 | 6/1997 |
| EP | 779352 | 6/1997 |
| EP | 1193305 A1 | 4/2002 |
| EP | 509673 | 11/2003 |
| GB | 2510322 | 8/2014 |
| JP | 04-018484 | 1/1992 |
| JP | 07-173462 | 7/1995 |
| JP | 08-143696 | 6/1996 |
| JP | 08-170074 | 7/1996 |
| JP | 09-208940 | 8/1997 |
| JP | 11-181414 | 7/1999 |
| WO | 92/01762 | 2/1992 |
| WO | 92/11339 | 7/1992 |
| WO | 92/16597 | 10/1992 |
| WO | 94/26835 | 11/1994 |
| WO | 95/08602 | 3/1995 |
| WO | 96/03472 A1 | 2/1996 |
| WO | 96/03473 | 2/1996 |
| WO | 97/15637 | 1/1997 |
| WO | 97/07179 | 2/1997 |
| WO | 98/08912 | 3/1998 |
| WO | 99/36485 | 7/1999 |
| WO | 2005/083028 | 9/2005 |
| WO | 2008/113984 | 9/2008 |
| WO | 2011/077088 | 6/2011 |
| WO | 2014/076475 | 5/2014 |

OTHER PUBLICATIONS

Written Opinion of the Searching Authority, dated Jul. 15, 2016, for International Patent Application No. PCT/GB2016/050827.
U.S. Appl. No. 12/281,304, Office Action dated Oct. 14, 2010.
U.S. Appl. No. 12/281,304, Office Action dated Mar. 25, 2011.
U.S. Appl. No. 12/281,304, Office Action dated Jul. 6, 2011.
U.S. Appl. No. 12/281,304, Office Action dated Nov. 16, 2011.
U.S. Appl. No. 12/281,304, Office Action dated May 1, 2012.
U.S. Appl. No. 12/281,304, Office Action dated Apr. 5, 2013.
U.S. Appl. No. 12/281,304, Notice of Allowance dated Aug. 21, 2013.
U.S. Appl. No. 12/281,306, Office Action dated Mar. 24, 2010.
U.S. Appl. No. 12/281,306, Office Action dated Oct. 18, 2010.
U.S. Appl. No. 12/281,306, Notice of Allowance dated Apr. 1, 2011.
U.S. Appl. No. 13/118,304, Office Action dated Nov. 29, 2011.
U.S. Appl. No. 13/118,304, Office Action dated Jun. 6, 2012.
U.S. Appl. No. 13/118,304, Office Action dated Oct. 15, 2012.
U.S. Appl. No. 13/118,304, Notice of Allowance dated May 6, 2013.
U.S. Appl. No. 13/893,179, Office Action dated Oct. 30, 2014.
U.S. Appl. No. 13/893,179, Office Action dated Dec. 12, 2014.
U.S. Appl. No. 13/893,179, Notice of Allowance dated Apr. 24, 2015.
U.S. Appl. No. 13/515,798, Office Action dated Feb. 5, 2015.
U.S. Appl. No. 13/515,798, Notice of Allowance dated Feb. 23, 2015.
U.S. Appl. No. 15/029,232, Non-Final Office Action, dated Sep. 13, 2016.
U.S. Appl. No. 15/029,232, Notice of Allowance, dated Jan. 5, 2017.
U.S. Appl. No. 15/029,232, Corrected Notice of Allowability, dated Feb. 3, 2017, for .
U.S. Appl. No. 15/431,427, Non-Final Office Action, dated Mar. 3, 2017.
U.S. Appl. No. 15/431,427, Notice of Allowance, dated Apr. 5, 2017.

* cited by examiner

NON-OZONE DEPLETING AND LOW GLOBAL WARMING REFRIGERANT BLENDS

This invention relates to refrigerant compositions.

Chlorofluorocarbons (CFCs) such as CFC12 and CFC502 and hydrochlorofluorocarbons (HFCs) such as HCFC22 migrate to the stratosphere where they are broken down by ultra violet light producing chlorine atoms that destroy the ozone layer. These Ozone Depleting Substances (ODS) are in the process of being replaced by non-ozone depleting alternatives such as hydrofluorocarbons (HFCs) which are non-flammable, efficient and of low toxicity. In certain applications, particularly but not specifically related to low temperature refrigeration systems often used in supermarkets, R502 was the main refrigerant of choice due largely to its lower discharge temperature compared to R22. As a consequence of the global environmental agreement embodied in the Montreal Protocol, R502 has been banned. R502 has been largely replaced by the HFCs R404A and R507. However R404A and R507, while being excellent refrigerants in terms of energy efficiency, non-flammability, low toxicity and thermodynamic properties, nevertheless have GWPs which are at the high end of the commonly used HFCs.

It is an object of this invention to provide refrigerant compositions which have Global Warming Potentials (GWP) exceeding 1,000 but less than 1600 on an Integrated Time Horizon (ITH) of 100 years. In this specification the numerical value for Global Warming Potential (GWP) refer to an Integrated Time Horizon (ITH) of 100 years as contained in the Inter-Governmental Panel on Climate Change Fourth Assessment Report (AR4) and have no adverse effect on stratospheric ozone. This invention relates to blends which are particularly, but not exclusively, to compositions for the replacement of R404A and R507 in refrigeration systems and are non-flammable, energy efficient and of low toxicity.

This invention relates particularly to refrigerant compositions that have considerably lower GWPs than R404A and R507, but which are also non-flammable and have lower discharge temperatures than alternative compositions such as R407A, R407F and R442A. Thus enables their use in a wide range of refrigeration applications where refrigerants with high discharge temperatures can cause problems with certain types of compressors. This is particularly the case when R404A or R507 are replaced in existing equipment where the compressor has been designed to use R404A and R507.

While hydrocarbons and carbon dioxide ($CO_2$) are technically feasible in refrigeration systems, and both have considerably lower GWPs than HFCs, these R404A and R507 alternatives have inherent disadvantages which mitigate against their general usage, particularly in public areas such as supermarkets. Highly flammable hydrocarbons can only be used safely in conjunction with a secondary refrigeration circuit which makes for energy inefficiency and higher costs. $CO_2$ has to be used in the transcritical state on the high pressure side of the system again resulting in an energy penalty. The very high operating pressures, typically in excess of 100 barg, present a significant safety hazard. Neither hydrocarbons nor $CO_2$ can be retrofitted into existing R404A and R507 units.

According to this invention a refrigerant composition comprises

| | |
|---|---|
| R125 | 20-35% |
| R32 | 20-35% |
| R1234ze(E) | 25-50% |
| R227ea | 1-10% | wherein the percentages are by weight and are selected from the ranges quoted to total 100%.

Preferred compositions have a direct GWP below 1,500 but greater than 1,000. Preferred compositions are also non-flammable in accordance with the requirements of ASHRAE Standard 34.

Especially preferred compositions have a direct GWP in the range from greater than 1000, preferably 1290, more preferably 1270, most preferably 1200, up to a limit of 1340.

In preferred embodiments of this invention the compositions consist essentially of the recited HFCs so that any additional components or impurities are not present to a sufficient extent to effect the essential properties of the composition.

Particularly preferred embodiments consist of the recited ingredients so that no further ingredients are present.

Particularly preferred refrigerants have direct GWPs which are less than half, and in some cases less than one third, of those of R404A and R507.

Preferred embodiments of this invention provide refrigerants essentially consisting of blends of non-flammable HFC125 and HFC227ea with flammable HFC32 and HFO-1234ze(E) in proportions selected such that the compositions are non-flammable during fractionation while providing similar or superior refrigerating effects and performances as the refrigerants they are intended to replace, namely R404A and R507.

HFO-1234ze(E) is trans-1, 3, 3, 3-tetrafluoroprop-1-ene. It is non-flammable below 30° C. but becomes flammable at higher temperatures. Surprisingly we have found that mixing HFO-1234ze(E) with up to 40 wt % of non-flammable HFC-227ea may produce an essentially co-distilling blend that is non-flammable at temperatures up to at least 60° C. as per the ASHRAE 34 standard. This HFO-1234ze(E)/HFC-227ea blend may be mixed with a non-flammable, essentially co-distilling blend of HFC-32 and HFC-125 to provide a blend of all four components that is non-flammable according to the ASHRAE 34 protocol and which can be used to replace R404A and R507 in refrigeration installations.

The refrigerant compositions provided by this invention can be used with any lubricant which is suitable for HFC refrigerants, including, but not limited to, polyol esters (POEs), polyalkylene glycols (PAGs) and mixtures thereof. Although HFCs and HFOs are known to be generally miscible with these lubricants, at evaporation temperatures below −30° C. and especially below −35° C. the liquid in the evaporator may separate into a higher viscosity, oil-rich phase and a lower viscosity, refrigerant rich phase. The higher viscosity has been found to coat the inner surfaces of the evaporator thus reducing heat transfer and adversely affecting energy efficiency. Accumulation of lubricant in the evaporator may also result in reduction of the quantity in the compressor sump leading to excessive wear of the compressor. While not wishing to be bound by theory, it is considered that the presence of R227ea in the refrigerant blend may help to emulsify the two liquid phases, providing an emulsion which may be driven more easily through the evaporator and back to the compressor by the refrigerant flow.

The oxygen containing POE and PAG lubricants may also be mixed with up to 50% hydrocarbon lubricants, for example mineral oil, alkyl benzenes and polyalpha-olefins. A preferred refrigerant composition comprises:

| | |
|---|---|
| R125 | 22-33% |
| R32 | 22-33% |
| R1234ze(E) | 30-45% |
| R227ea | 2-9% |

A further preferred refrigerant composition comprises:

| | |
|---|---|
| R125 | 25-32% |
| R32 | 25-32% |
| R1234ze(E) | 32-43% |
| R227ea | 3-8% |

Another preferred refrigerant composition is:

| | |
|---|---|
| R125 | 26-30% |
| R32 | 26-30% |
| R1234ze(E) | 34-42% |
| R227ea | 3-7% |

Another preferred refrigerant composition is:

| | |
|---|---|
| R125 | 27-29% |
| R32 | 27-29% |
| R1234ze(E) | 36-40% |
| R227ea | 3-6% |

Another preferred refrigerant composition comprises:

| | |
|---|---|
| R125 | 28% |
| R32 | 28% |
| R1234ze(E) | 39% |
| R227ea | 5% |

Another preferred refrigerant composition comprises:

| | |
|---|---|
| R125 | 27% |
| R32 | 27% |
| R1234ze(E) | 42% |
| R227ea | 4% |

Another a preferred refrigerant composition comprises:

| | |
|---|---|
| R125 | 27% |
| R32 | 27% |
| R1234ze(E) | 43% |
| R227ea | 3% |

Another preferred refrigerant composition comprises:

| | |
|---|---|
| R125 | 27% |
| R32 | 27% |
| R1234ze(E) | 42% |
| R227ea | 4% |

Another preferred refrigerant composition comprises:

| | |
|---|---|
| R125 | 27% |
| R32 | 27% |
| R1234ze(E) | 41% |
| R227ea | 5% |

This composition has a GWP less than 1400 but greater than 1100 and is non-flammable.

Another preferred refrigerant composition comprises:

| | |
|---|---|
| R125 | 27% |
| R32 | 27% |
| R1234ze(E) | 38% |
| R227ea | 8% |

This composition has a GWP less than 1400 but greater than 1100 and is non-flammable.

Another preferred refrigerant composition comprises:

| | |
|---|---|
| R125 | 26.5% |
| R32 | 26.5% |
| R1234ze(E) | 41% |
| R227ea | 6% |

This composition has a GWP less than 1400 but greater than 1100 and is non-flammable.

The present invention enables the replacement of R404A and R507, the most commonly used refrigerants in lower temperature refrigeration equipment, providing a substantial reduction in GWP of approximately two thirds with blends having a GWP between 1000 and 1600, and without any reduction in performance including energy efficiency and capacity.

The invention is further described by means of examples but not in a limitative sense.

EXAMPLES 1 to 7

The cycle performances of blends containing R32, R125, R-1234ze(E) and R227ea, shown in Table 1 were modelled using the NIST Cycle D v4 program under conditions typical of low temperature, supermarket refrigeration shown in Table 1. These blends are replacements for the commercial refrigerants R404A (Example 1) and R507 (Example 8) whose performances are also given in Table 2.

TABLE 1

| Parameter | Unit | Value |
|---|---|---|
| System cooling capacity (kW) | kW | 100 |
| Compressor isentropic efficiency | | 0.8 |
| Compressor volumetric efficiency | | 0.9 |
| Electric motor efficiency | | 0.9 |
| Evaporator: average sat. temp. | ° C. | −35 |
| Superheat | K | 5 |
| Condenser: average sat. temp. | ° C. | 35 |
| Subcooling | K | 5 |
| Evaporator fan power | kW | 3 |
| Condenser fan power | kW | 4 |
| Control power | kW | 1 |

TABLE 2

| Examples | | 1 | 2 | 3 | 4 | 5 | 6 | 7 | 8 |
|---|---|---|---|---|---|---|---|---|---|
| Composition | | R404A | | | | | | | R507 |
| R134a | | 4 | | | | | | | |
| R143a | | 52 | | | | | | | 50 |
| R32 | | | 30 | 28 | 27 | 27 | 29 | 24 | |
| R125 | | 44 | 30 | 28 | 27 | 27 | 28 | 25 | 50 |
| R1234zeE | | | 35 | 39 | 42 | 43 | 40 | 46 | |
| R227ea | | | 5 | 5 | 4 | 3 | 3 | 5 | |
| R152a | | | | | | | | | |
| Performance Parameters | | | | | | | | | |
| Discharge pressure | Bara | 16.73 | 16.69 | 16.69 | 15.76 | 15.74 | 16.24 | 14.98 | 17.17 |
| Discharge temperature | °C. | 72.3 | 99.5 | 90.4 | 97.7 | 98 | 99.5 | 95.1 | 70.7 |
| Coefficient of Performance | | 1.288 | 1.342 | 1.324 | 1.347 | 1.348 | 1.345 | 1.352 | 1.279 |
| Suction specific volume | kJ/(m$^3$ · kW) | 732.1 | 735.1 | 711.6 | 684.2 | 683.6 | 711.4 | 640.9 | 750.7 |
| Pressure ratio | | 10.8 | 12.52 | 12.56 | 12.85 | 12.86 | 12.69 | 13.15 | 10.61 |
| Evaporator glide | K | 0.5 | 6.4 | 6.4 | 7.3 | 7.3 | 6.9 | 7.8 | 0 |
| Mass flow rate | kg/(s · kW)*10$^3$ | 9.61 | 7.00 | 8.07 | 7.06 | 7.03 | 6.95 | 7.20 | 9.96 |
| GWP | tes CO2 equivalent | 3922 | 1432 | 1330 | 1256 | 1224 | 1272 | 1198 | 3985 |

| Examples | | 9 | 10 | 11 | 12 | 13 | 14 |
|---|---|---|---|---|---|---|---|
| Composition | | | | | | | |
| 134a | | 0 | 0 | 0 | 0 | 0 | 0 |
| R143a | | 0 | 0 | 0 | 0 | 0 | 0 |
| R32 | | 28 | 29 | 31 | 28 | 29 | 31 |
| R125 | | 28 | 29 | 31 | 28 | 29 | 31 |
| R1234zeE | | 36.1 | 33.3 | 29.7 | 36.1 | 35.15 | 31.35 |
| R227ea | | 5.65 | 6.825 | 6.425 | 6 | 5.65 | 5.65 |
| R152a | | 2.25 | 1.875 | 1.875 | 2.25 | 2.25 | 2.25 |
| Performance Parameters | | | | | | | |
| Discharge pressure | Bara | 15.07 | 15.69 | 15.92 | 15.37 | 15.66 | 16.22 |
| Discharge temperature | deg C. | 96.0 | 93.7 | 97.8 | 93.4 | 94.1 | 95.4 |
| Coefficient of Performance | | 1.66 | 1.64 | 1.65 | 1.64 | 1.64 | 1.64 |
| Suction specific volume | kJ/(m$^3$ · kW) | 750 | 773 | 802 | 755 | 772 | 808 |
| Pressure ratio | | 11.4 | 11.3 | 11.2 | 11.4 | 11.3 | 11.1 |
| Evaporator glide | K | 6.3 | 6.4 | 5.7 | 6.7 | 6.5 | 5.9 |
| Mass flow rate | kg/(s · kW)*10$^3$ | 6.40 | 6.77 | 6.36 | 6.75 | 6.72 | 6.66 |
| GWP | tes CO2 equivalent | 1415 | 1433 | 1504 | 1354 | 1374 | 1451 |

The invention claimed is:

1. A refrigerant composition comprising:

| | |
|---|---|
| R125 | 20-35% |
| R32 | 20-35% |
| R1234ze(E) | 25-50% |
| R227ea | 1-10% | wherein the percentages are by weight and are selected from the ranges quoted to total 100%.

2. A refrigerant composition as claimed in claim 1 comprising:

| | |
|---|---|
| R125 | 22-33% |
| R32 | 22-33% |
| R1234ze(E) | 30-45% |
| R227ea | 2-9%. |

3. A refrigerant composition as claimed in claim 2 comprising:

| | |
|---|---|
| R125 | 25-32% |
| R32 | 25-32% |
| R1234ze(E) | 32-43% |
| R227ea | 3-8%. |

4. A refrigerant composition as claimed in claim 3 comprising:

| | |
|---|---|
| R125 | 26-20% |
| R32 | 26-30% |
| R1234ze(E) | 34-42% |
| R227ea | 3-7%. |

5. A refrigerant composition as claimed in claim 4 comprising:

| | |
|---|---|
| R125 | 27-29% |
| R32 | 27-29% |
| R1234ze(E) | 36-40% |
| R227ea | 3-6%. |

6. A refrigerant composition as claimed in claim 5 comprising

| | |
|---|---|
| R125 | 28% |
| R32 | 28% |

-continued

| | |
|---|---|
| R1234ze(E) | 39% |
| R227ea | 5%. |

7. A refrigerant composition as claimed in claim 3 comprising:

| | |
|---|---|
| R125 | 27% |
| R32 | 27% |
| R1234ze(E) | 43% |
| R227ea | 3%. |

8. A refrigerant composition as claimed in claim 4 comprising:

| | |
|---|---|
| R125 | 27% |
| R32 | 27% |
| R1234ze(E) | 42% |
| R227ea | 4%. |

9. A refrigerant composition as claimed in claim 4 comprising

| | |
|---|---|
| R125 | 27% |
| R32 | 27% |
| R1234ze(E) | 41% |
| R227ea | 5%. |

10. A refrigerant composition as claimed in claim 3 comprising

| | |
|---|---|
| R125 | 27% |
| R32 | 27% |
| R1234ze(E) | 38% |
| R227ea | 8%. |

11. A refrigerant composition as claimed in claim 4 comprising

| | |
|---|---|
| R125 | 26.5% |
| R32 | 26.5% |
| R1234ze(E) | 41% |
| R227ea | 6%. |

12. A refrigerant composition as claimed in claim 1 comprising

| | |
|---|---|
| R125 | 20-35% |
| R32 | 20-35% |
| R1234ze(E) | 25-50% P |
| R227ea | 1-10%. |

13. A refrigerant composition as claimed in claim 1 comprising:

| | |
|---|---|
| R125 | 22-33% |
| R32 | 22-33% |
| R1234ze(E) | 30-45% |
| R227ea | 2-9% |
| R152a | 2-9%. |

14. A refrigerant composition as claimed in claim 1 comprising:

| | |
|---|---|
| R125 | 25-32% |
| R32 | 25-32% |
| R1234ze(E) | 32-43% |
| R227ea | 3-8% |
| R152a | 3-8%. |

15. A refrigerant composition consisting only of the components as claimed in claim 1.

16. A refrigerant composition as claimed in claim 1, having a Global Warming Potential greater than 1000.

* * * * *